United States Patent
Dever et al.

(10) Patent No.: US 9,074,859 B1
(45) Date of Patent: Jul. 7, 2015

(54) MARKING CARTRIDGE

(71) Applicant: Anza Corporation, Stowe, VT (US)

(72) Inventors: Kathleen M. Dever, Stowe, VT (US); Thomas G. Ference, Essex Junction, VT (US)

(73) Assignee: Anza Corporation, Stowe, VT (US)

( * ) Notice: Subject to any disclaimer, the term of this patent is extended or adjusted under 35 U.S.C. 154(b) by 159 days.

(21) Appl. No.: 13/964,096

(22) Filed: Aug. 11, 2013

Related U.S. Application Data

(60) Provisional application No. 61/682,266, filed on Aug. 12, 2012.

(51) Int. Cl.
*G01B 3/10* (2006.01)
*B25H 7/04* (2006.01)
*G01B 3/00* (2006.01)

(52) U.S. Cl.
CPC ........ *G01B 3/002* (2013.01); *G01B 2003/1089* (2013.01)

(58) Field of Classification Search
CPC ................ G01B 2003/1089; G01B 3/002
USPC .......................................................... 33/668
See application file for complete search history.

(56) References Cited

U.S. PATENT DOCUMENTS

| | | | | |
|---|---|---|---|---|
| 3,262,211 A | * | 7/1966 | Beckett | 33/668 |
| 3,336,678 A | * | 8/1967 | Chamberlain et al. | 33/668 |
| 3,802,083 A | * | 4/1974 | Freed | 33/668 |
| 4,965,941 A | * | 10/1990 | Agostinacci | 33/668 |
| 5,829,152 A | | 11/1998 | Potter et al. | |
| 6,041,513 A | * | 3/2000 | Doak | 33/668 |
| 6,178,655 B1 | | 1/2001 | Potter et al. | |
| 6,574,881 B2 | * | 6/2003 | Cole, III | 33/668 |
| 6,892,469 B2 | * | 5/2005 | Tufts et al. | 33/768 |
| 6,996,915 B2 | * | 2/2006 | Ricalde | 33/770 |
| 7,234,245 B2 | * | 6/2007 | Tatum | 33/666 |
| 7,278,223 B1 | | 10/2007 | Dever et al. | |
| 8,196,308 B1 | * | 6/2012 | Baldi, Jr. | 33/668 |
| 2014/0237838 A1 | * | 8/2014 | Phelps | 33/770 |
| 2014/0317943 A1 | * | 10/2014 | DeMartinis et al. | 33/668 |

OTHER PUBLICATIONS

I-Mark-tools. Printed Aug. 11, 2012. "I-MarkTools—Marking Tape Measure and Tools". http://www.i-marktools.com/index.php. 1 page.
I-Mark-tools. Printed Aug. 11, 2012. "I-MarkTools—Marking Tape Measure and Tools". http://www.i-marktools.com/pages/technology. php. 1 page.
I-Mark-tools. Printed Aug. 11, 2012. "I-MarkTools—Marking Tape Measure and Tools". http://www.i-marktools.com/pages/products. php. 1 page.

* cited by examiner

*Primary Examiner* — Christopher Fulton
(74) *Attorney, Agent, or Firm* — Thomas G. Ference

(57) ABSTRACT

The present application is directed to a marking cartridge to be used with a hand tool. The marking cartridge comprises a support structure that includes an engaging element having an engaging end and enclosing surface, a positioning element parallel to the engaging element, the positioning element having a vertical positioning surface and lateral edges, and a vertical step connecting the engaging element to the positioning element to form a depressed support region. The cartridge further comprises an alignment lock extending from the engaging surface; a cartridge aliment guide extending from each lateral edge; a marking element having a marking surface, the marking element mounted in the depressed support region to the vertical positioning surface such that the marking surface extends beyond the enclosing surface; and a resilient material mounted in the depressed support region to the vertical positioning surface and extending beyond the marking surface.

20 Claims, 15 Drawing Sheets

MARKING CARTRIDGE

RELATED APPLICATIONS

This application claims the benefit of U.S. Provisional Patent Application No. 61/682,266, filed Aug. 12, 2012 entitled "Marking Cartridge", which is incorporated herein by reference.

FIELD

This patent application generally relates to a marking cartridge. More specifically it relates to a replaceable marking cartridge that is structured to be incorporated into measuring tools, the cartridge is for recording information from the measuring tool onto a surface.

BACKGROUND

For centuries measuring hand tools have been used to aid individuals working in the construction and home improvement industries. Some examples include rulers, tape measures, levels, protractors, stud finders, nail detectors and laser rulers just to name a few. When using these hand tools it is usually necessary to record the information gathered from the tool onto the surface on which the measurement took place. The process of the transference of information can be subject to inaccuracies and historically has involved the user taking a pen or pencil and marking information on the measured surface by hand. More recently, improvements have been made to produce a mark on the measured surface automatically from the measuring handtool. U.S. Pat. Nos. 5,829,152, 6,178,655 and 7,278,223 to Potter and Dever provide examples of some of these tools and all of these patents are herein incorporated by reference. These newer tools reduce the time involved in marking and free up the user's second hand for other processes such as positioning the tool more accurately. These newer types of tools necessarily require some sort of marking element that usually is consumed over time. The integration of the marking element with the tool is challenging. The marking element's accuracy, compactness and ease of replacement depend on many parameters. The current patent application provides for a simple, replaceable marking cartridge that solves these challenges.

SUMMARY

One aspect of the present patent application is directed to a marking cartridge, comprising a stepped support structure including i) an engaging element having an engaging end and enclosing surface, ii) a positioning element parallel to the engaging element, the positioning element having a vertical positioning surface and lateral edges, and iii) a vertical step connecting the engaging element to the positioning element to form a depressed support region. The cartridge further comprises an alignment lock proximate the engaging end; a cartridge aliment guide extending from each lateral edge; a marking element having a marking surface, the marking element mounted in the depressed support region to the vertical positioning surface such that the marking surface extends beyond the enclosing surface; and a resilient material mounted in the depressed support region to the vertical positioning surface and extending beyond the marking surface.

Another aspect of the present patent application is directed to a marking cartridge for creating a mark that corresponds to measured information, comprising a support structure, a marking element having a marking surface that creates the mark, a resilient material mounted to said support structure and extending beyond said marking surface, and a variable aligner integrated with said support structure to variably adjust position of said marking surface to set a desired location for the mark relative to the measured information.

BRIEF DESCRIPTION OF DRAWINGS

The foregoing and other aspects and advantages presented in this patent application will be apparent from the following detailed description, as illustrated in the accompanying drawings, in which.

DETAILED DESCRIPTION

Figure 1:
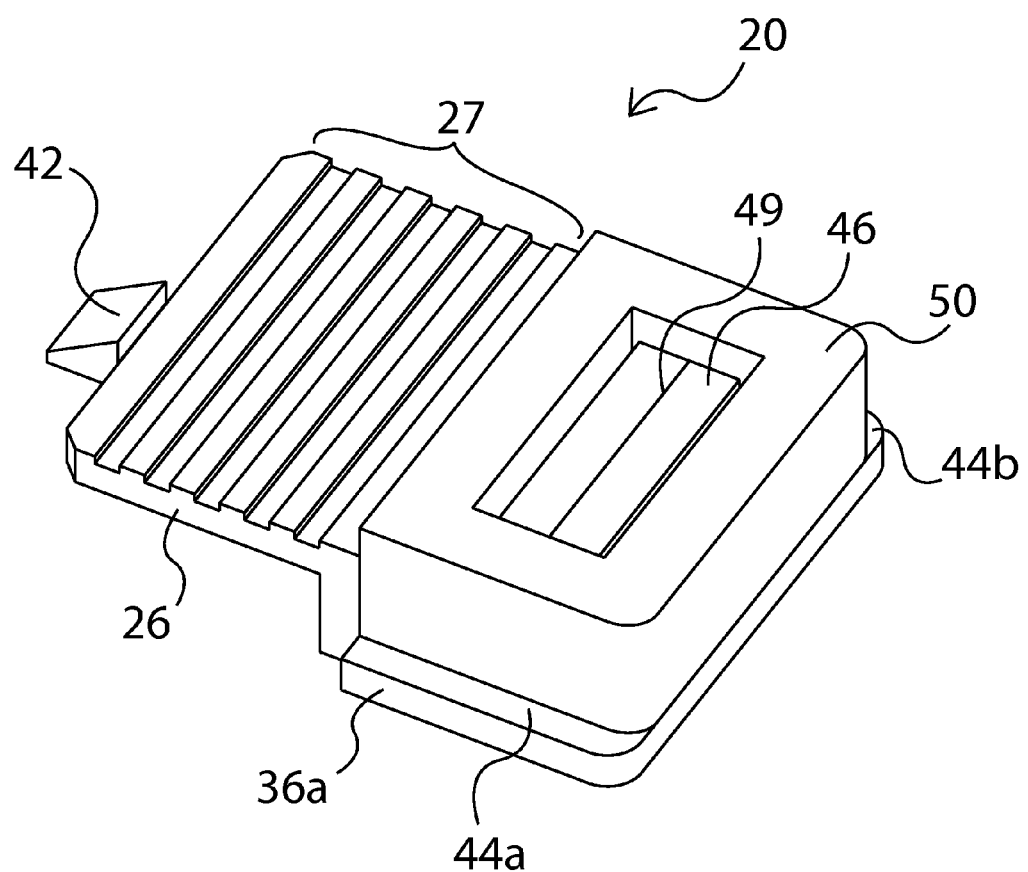
FIG. 1 is a bottom side, perspective view of one embodiment of a marking cartridge according to the present patent application.
Figure 2:
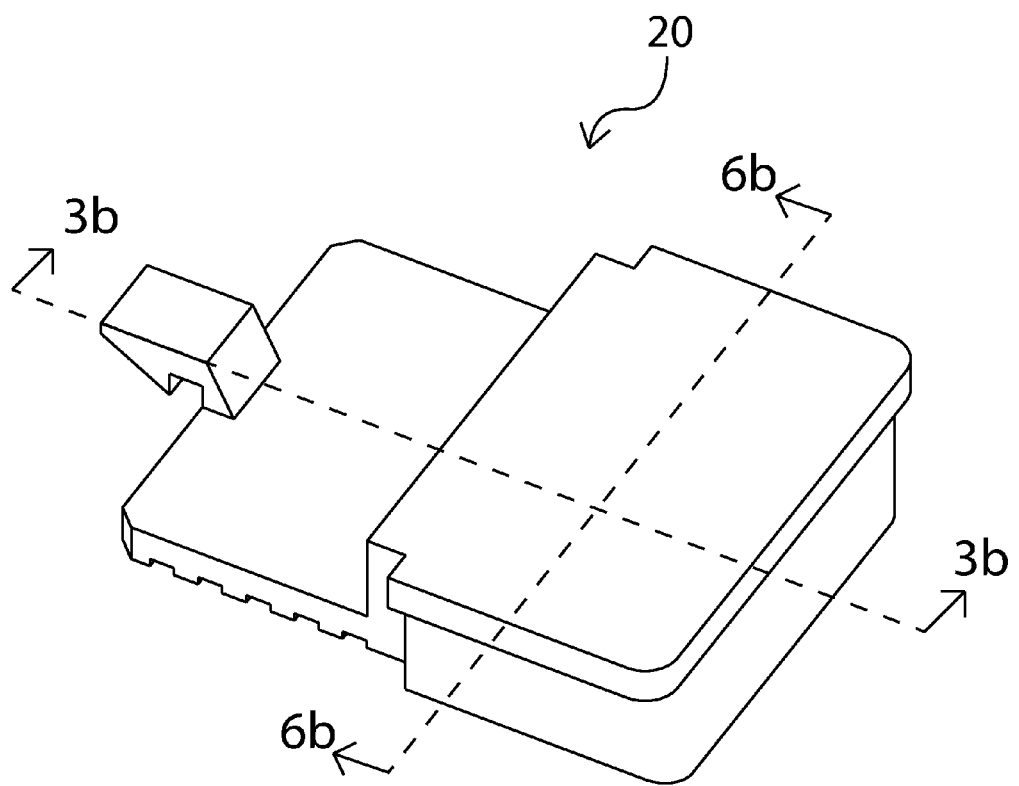
FIG. 2 is a topside, perspective view of the marking cartridge in FIG. 1.

Marking cartridge 20 is shown is shown in FIGS. 1-9. Marking cartridge 20 may be integrated with any number of measuring hand tools 22 such as a tape measure, stud finder, etc. Marking cartridge 20 comprises support structure 24. Support structure 24 may be a stepped support structure of unitary construction and may be formed by injection molding or be machined. Support structure 24 includes engaging element 26 that has engaging end 28 and enclosing surface 30. Support structure 24 also includes positioning element 32 having a vertical positioning surface 34 and lateral edges 36a and 36b. A vertical step 38 connects engaging element 26 to positioning element 32 to form a depressed support region 40. Vertical step 38 is preferably substantially parallel to engaging end 28.

Marking cartridge 20 further comprises an alignment lock 42 proximate or extending from engaging end 28. Alignment lock 42 is for locking marking cartridge 20 with the casing 59 of hand tool 22 to which the marking cartridge is to be secured. Alignment lock 42 in combination with support structure 24 provides a specific longitudinal alignment position for the marking cartridge 20 relative to hand tool 22. In FIGS. 1-7 and 9, one embodiment of alignment lock 42, the alignment lock extends away from enclosing surface 30. Alignment lock 42 includes slot 43 with a side that tapers away from the slot. Slot 43 is structured to mate with a rib on the casing of hand tool 22. The side taper and flexibility of alignment lock 42 provides for the locking and release mechanism. A variety of other structures can be used as alignment locks, such as other ridge and slot structures, adjacent magnets, a screw in a hole or slot (FIGS. 11 & 12, alignment lock 42b) and other fasteners.

Engaging element 28 may further include a textured gripping region 27 on enclosing surface 30. Gripping region 27 allows for the user to have improved finger grip with engaging element 28 in order to move the engaging element in and out of position with hand tool 22. One structure that may be provided on enclosing surface 30 is a series of grooves 39 and ridges 41 to create gripping region 27.

Marking cartridge 20 also comprises cartridge alignment guides 44a and 44b extending from each lateral edge 36a and 36b, respectively. Alignment guides 44a and 44b are provided to fit within alignment grooves in the casing of hand tool 22. Alignment guides 44a and 44b together with positioning element 32 have a combined width greater than the width of engaging element 26. This insures that cartridge 20 will smoothly slide within the casing of hand tool 22. Alignment guides 44a and 44b provide a specific lateral alignment position for the marking cartridge relative to hand tool 22. Alignment guides 44a and 44b work in cooperation with positioning element 32 and vertical positioning surface 34 to define the height of marking surface 48.

Marking cartridge 20 still further comprises marking element 46 that has marking surface 48. Marking element 46 is mounted in depressed support region 40 to vertical position surface 34 so that marking surface 48 extends beyond enclosing surface 30. Marking element 46 may be mounted with an adhesive, a guide mechanism or a compression fit. It is critical that the marking surface 48 extend beyond enclosing surface 30 or marking cartridge 20 will not mark when locked to hand tool 22. Marking element 46 is preferably a porous material having a matrix of connected pores impregnated with a marking substance. Marking substance may be ink, chalk, paint, crayon, lead, and others. Marking element 46 may also be a shaped marking element, indenter or scribe. Marking surface 46 is sealed to close the pores except for a region of open pores that form indicia 49 to be marked. Marking element 46 includes depressed sides or sides that have their pores sealed adjacent to marking surface 46. Having the sides sealed or depressed ensures that no marking substance will print around the edges of marking element 46 when resilient material 50 is compressed and marking surface 48 contacts the surface to be marked.

Figure 3A:
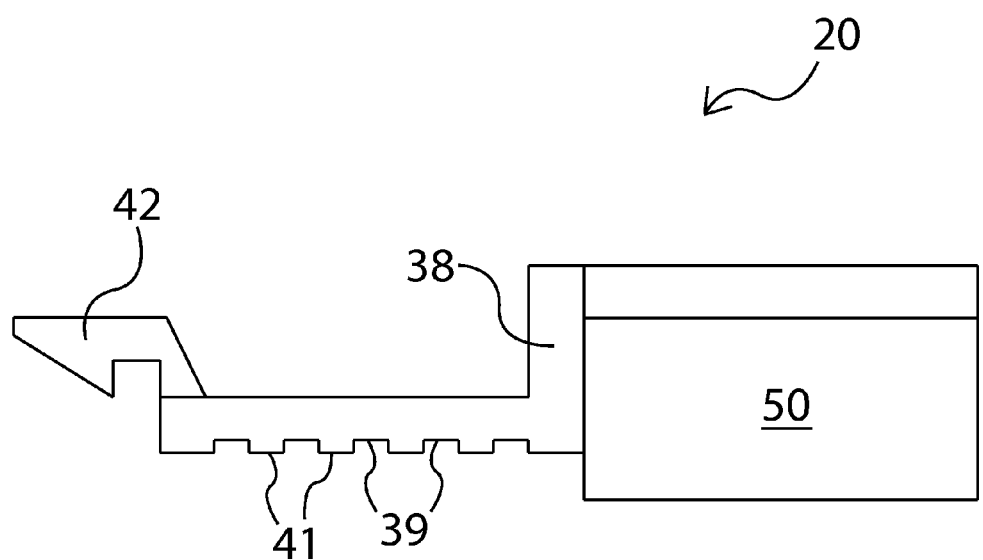
FIG. 3a is a left side view of the marking cartridge in FIG. 1.
Figure 3B:
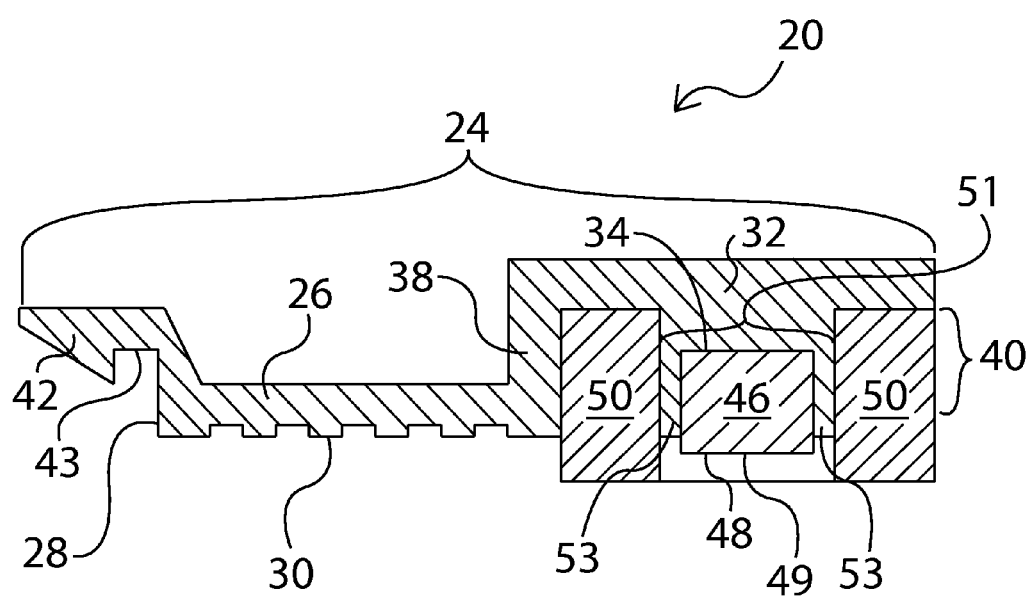
FIG. 3b is a left side, sectional view of the marking cartridge along line 3b-3b in FIG. 2.
Figure 4:
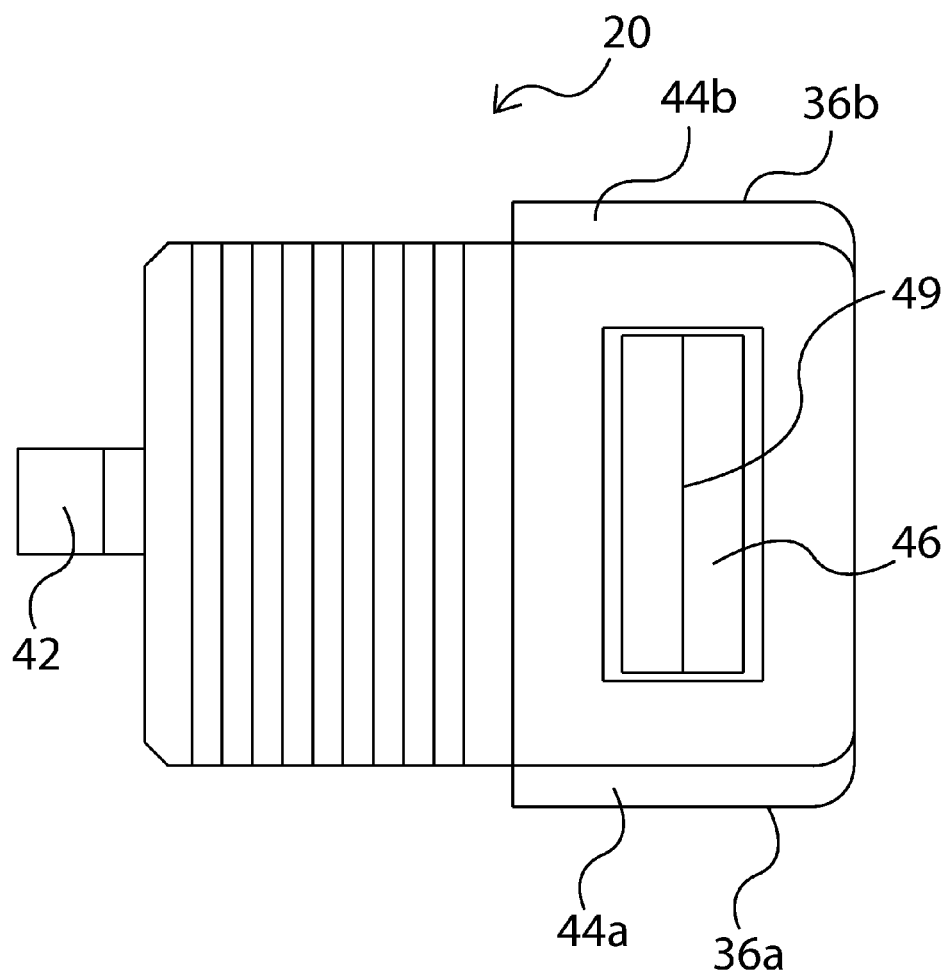
FIG. 4 is a bottom side view of the marking cartridge in FIG. 1.
Figure 5:
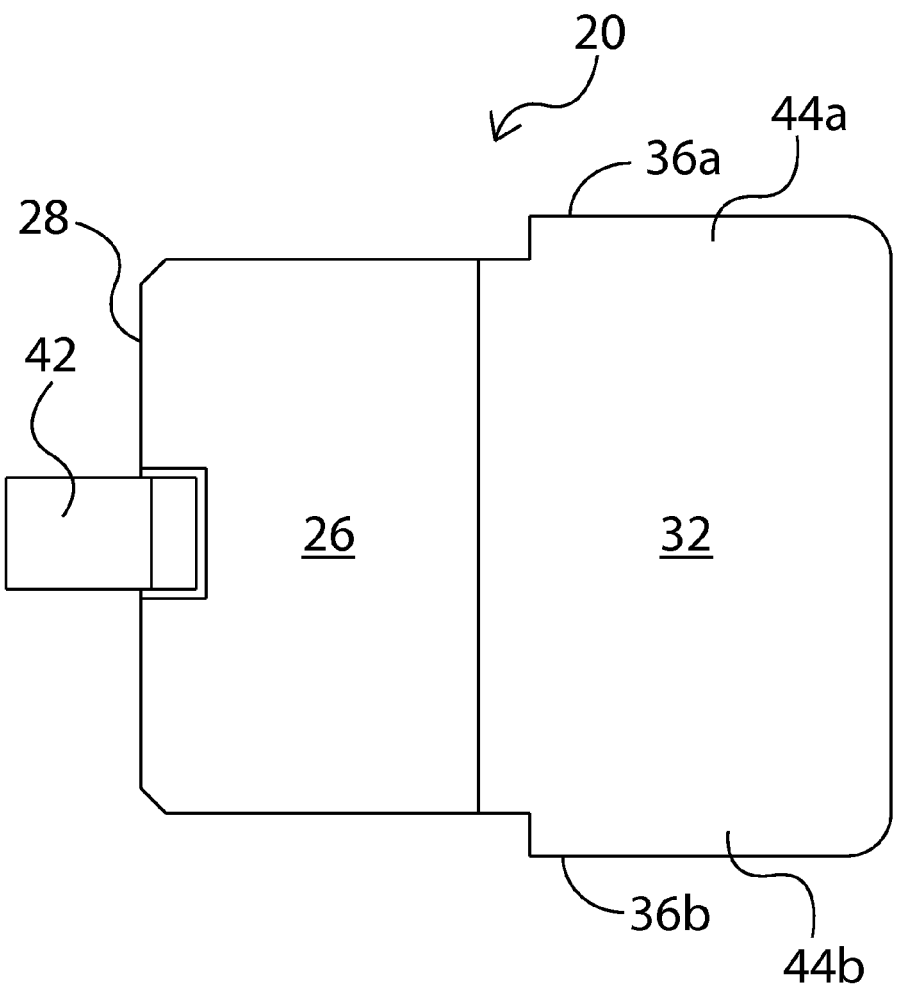
FIG. 5 is a topside view of the marking cartridge in FIG. 1.
Figure 6A:
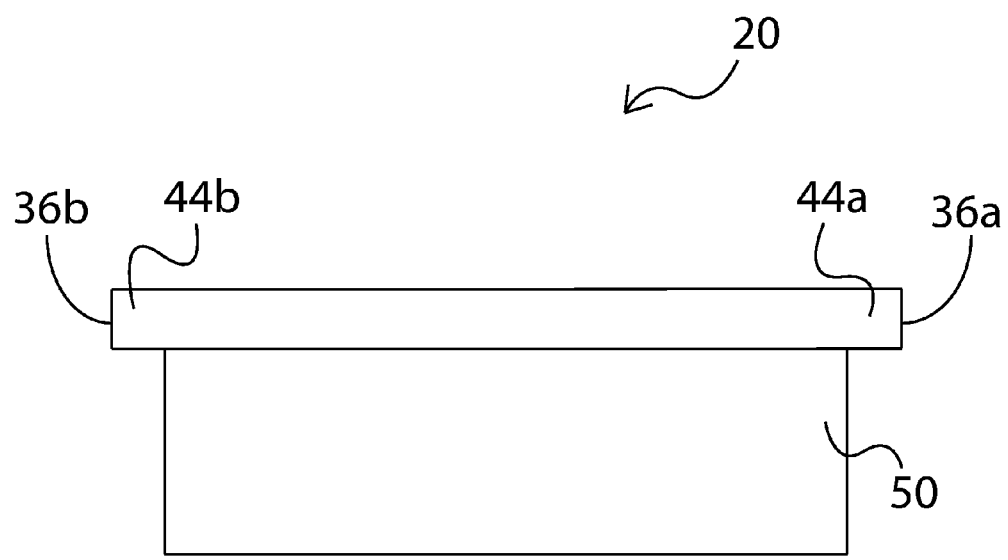
FIG. 6a is a front side view of the marking cartridge in FIG. 1.
Figure 6B:
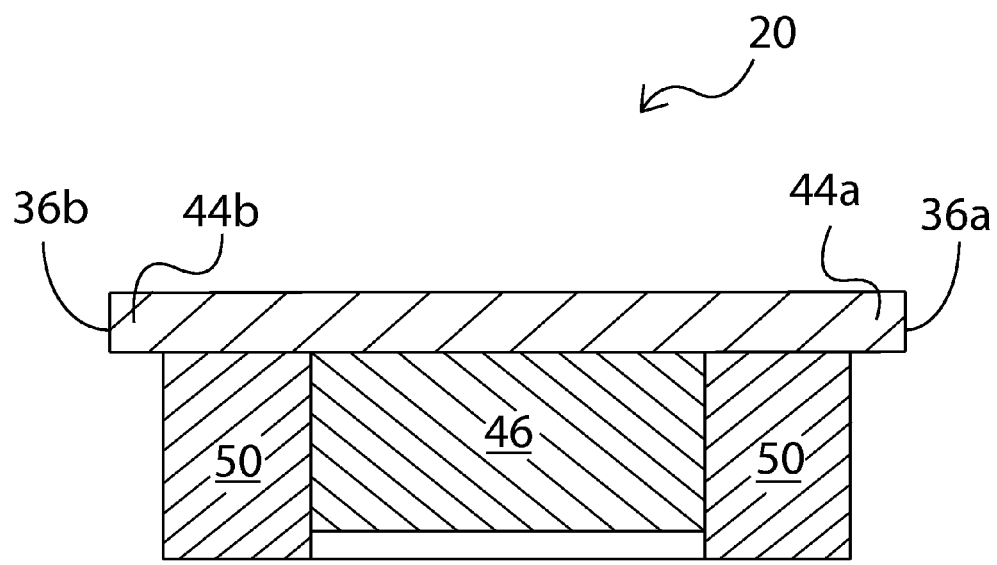
FIG. 6b is a front side, sectional view of the marking cartridge along line 6b-6b in FIG. 2.
Figure 7:
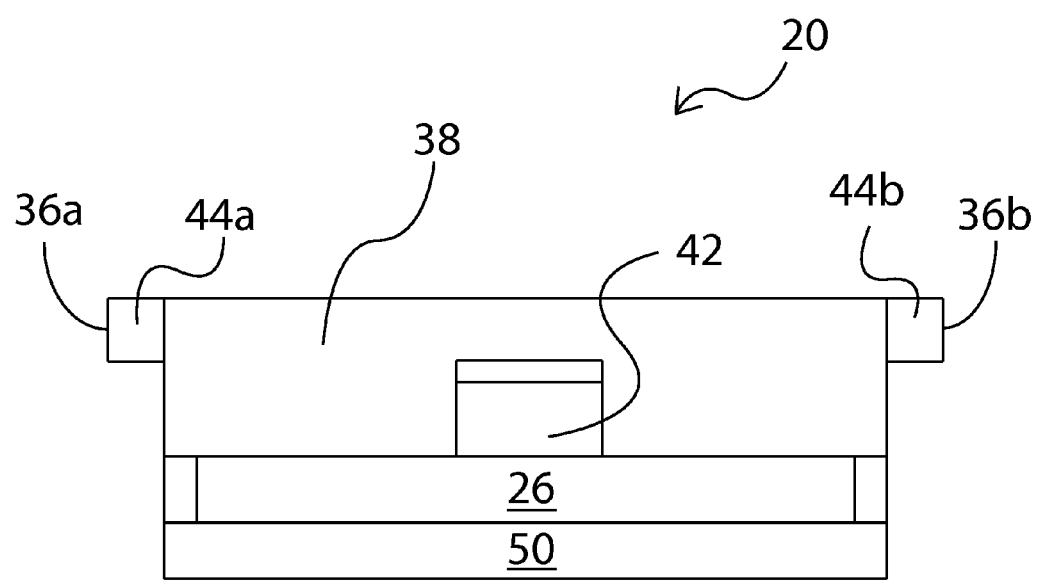
FIG. 7 is a back side view of the marking cartridge in FIG. 1.
Figure 8:
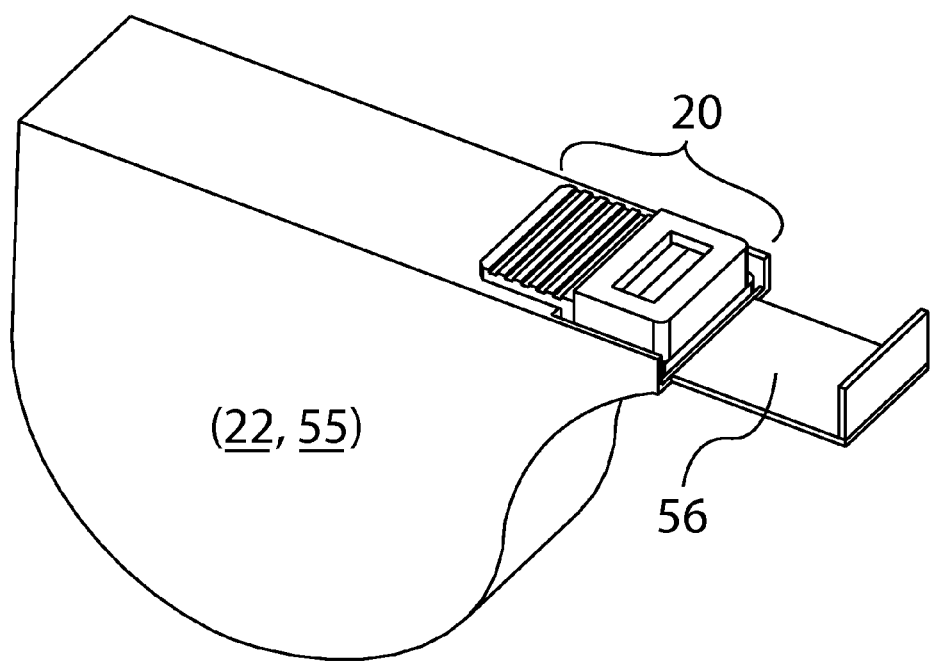
FIG. 8 is a perspective view of the marking cartridge of FIG. 1 integrated with a measuring hand tool.
Figure 9:
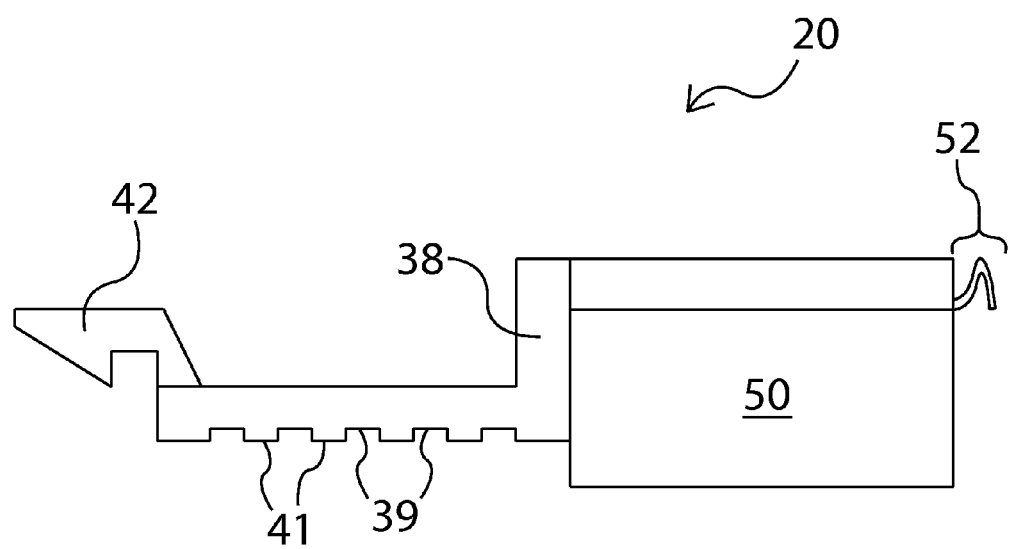
FIG. 9 is a left side view of the marking cartridge of FIG. 1 now having an embodiment with a shock absorber integrated with the marking cartridge.

To aid with aligning marking element 46 to vertical positioning surface 34, the vertical positioning surface may further include marking element alignment guide 51. Marking element guide holds marking element 46 so as to both position and support the marking element. FIGS. 3b & 4 show marking element supports 53 that make up part of marking alignment guide 51. Marking element supports 53 help support the sides of marking element 46. Marking element supports 53 location may be adjustable. Marking element supports 53 may further have holding grooves or ridges (not shown) that mate with the sides of marking element 46 to further support and align the marking element.

Resilient material 50 is mounted in depressed support region 40 to vertical positioning surface 34 and extends beyond marking surface 48. It is critical that resilient material 50 extend beyond marking surface 48 to keep the marking surface in a spaced-apart relationship to the surface to be marked until a user applies pressure in a direction perpendicular to the marking surface. By applying pressure in a direction perpendicular to marking surface 48, the pressure causes resilient material 50 to compress and the marking surface to extend to or just beyond the resilient material to imprint a mark on the surface to be marked. Resilient material 50 is preferably a resilient material that compresses uniformly around the marking element. Uniform compression insures that substantially the entire marking surface 48 will engage the surface to be marked at the same time and thereby provide for a uniform mark. Resilient material 50 may be resilient porous foam adhered to vertical positioning element 32. Alternatively, resilient material 50 may be porous foam injected directly onto positioning element 32. It is also preferable to have resilient material 50 circumscribe marking element 46. By having resilient material 50 circumscribe marking element 46, the marking element is protected from external elements and will not allow the marking element to mark except from marking surface 48. Resilient material 50 may also have a layer of toughening material or smoothing material added to the surface that will contact the surface to be marked. The toughening material improves the durability of the resilient material. The smoothing material aids in ease of movement of hand tool 22 across the surface to be measured and marked.

When marking cartridge 20 is used in conjunction with a tape measure 55, marking cartridge 20 may further include shock absorber 52 that absorbs some of the force from tape 56 as the tape is reeled back into the tape measure. The shock absorber 52 may be a spring mechanism integrated longitudinally along marking cartridge 20a, FIG. 9. The spring mechanism may be located on front end, back end or somewhere between those two ends. The spring mechanism shown is a thin, ridged region of positioning element 32 that compresses, thus absorbing some of the momentum of tape 56 when the tape reels back into the tape case. However, spring-type mechanism could be part of resilient material 50 or any other type of spring mechanism integrated with marking cartridge 20a.

Figure 10A:
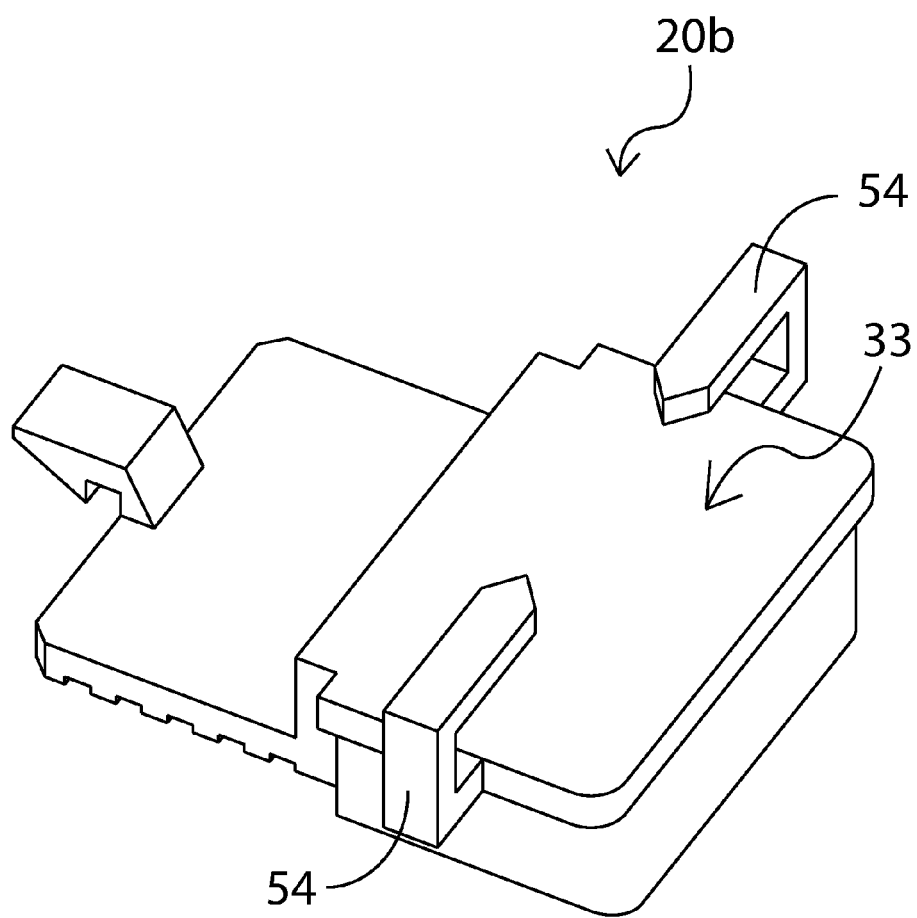
FIG. 10a is a perspective view of the marking cartridge in FIG. 1 now having an embodiment of cursors for alignment.
Figure 10B:
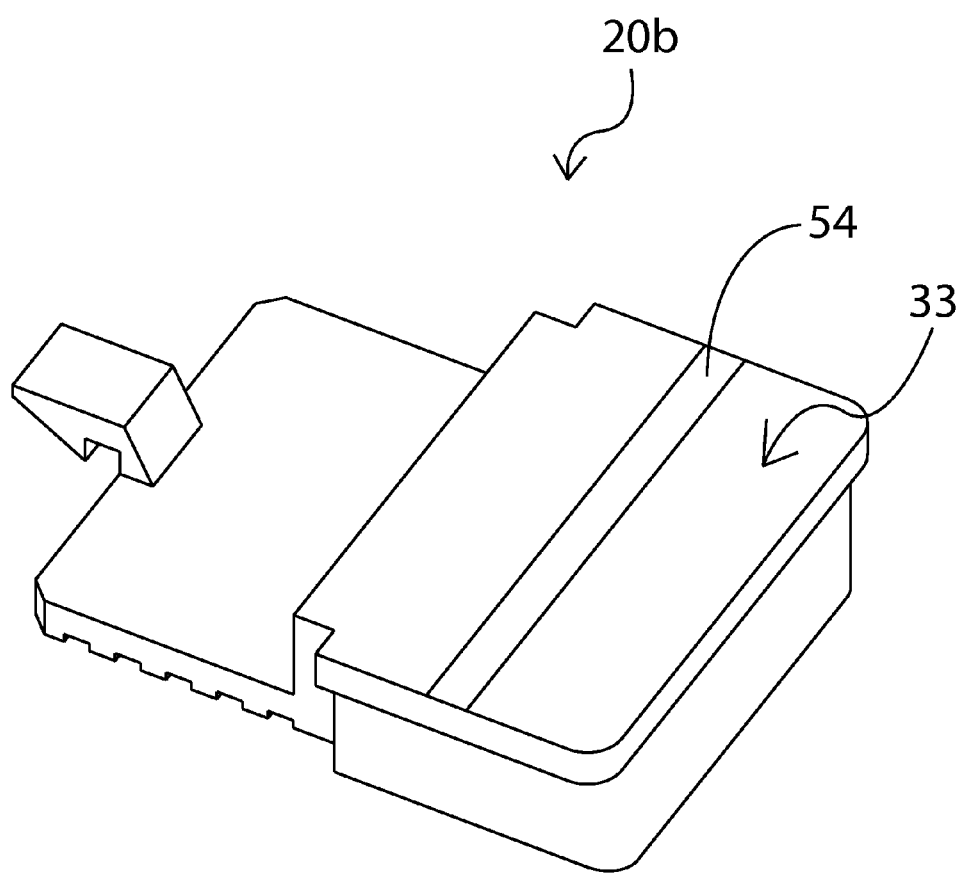
FIG. 10b is a perspective view of the marking cartridge in FIG. 1 now having another embodiment of cursors for alignment.

When marking cartridge 20 is used in conjunction with a tape measure 55, marking cartridge may further include cursors 54 and now become marking cartridge 20b, FIG. 10a. Cursors 54 extend from positioning element 32 and are structured so as to be visible over the top of the tape surface when marking cartridge 20b is locked within the tape measure. Cursors 54 are aligned to indicia 49 so that there is a direct correlation between the placement of a mark from indicia 49 and the reading made on the tape by the user. Alternatively, cursors 54 may be a structure that is scribed along top surface 33 or positioning element 32 so that tape 56 moves over the cursors, FIG. 10b. Cursors 54 are then visible on either side of tape 56. The cursors 54 add to accuracy of mark alignment, especially when another component such as shock absorber 52 is used in conjunction with marking cartridge 20b. Cursors 54 location may also be adjustable.

Figure 11:
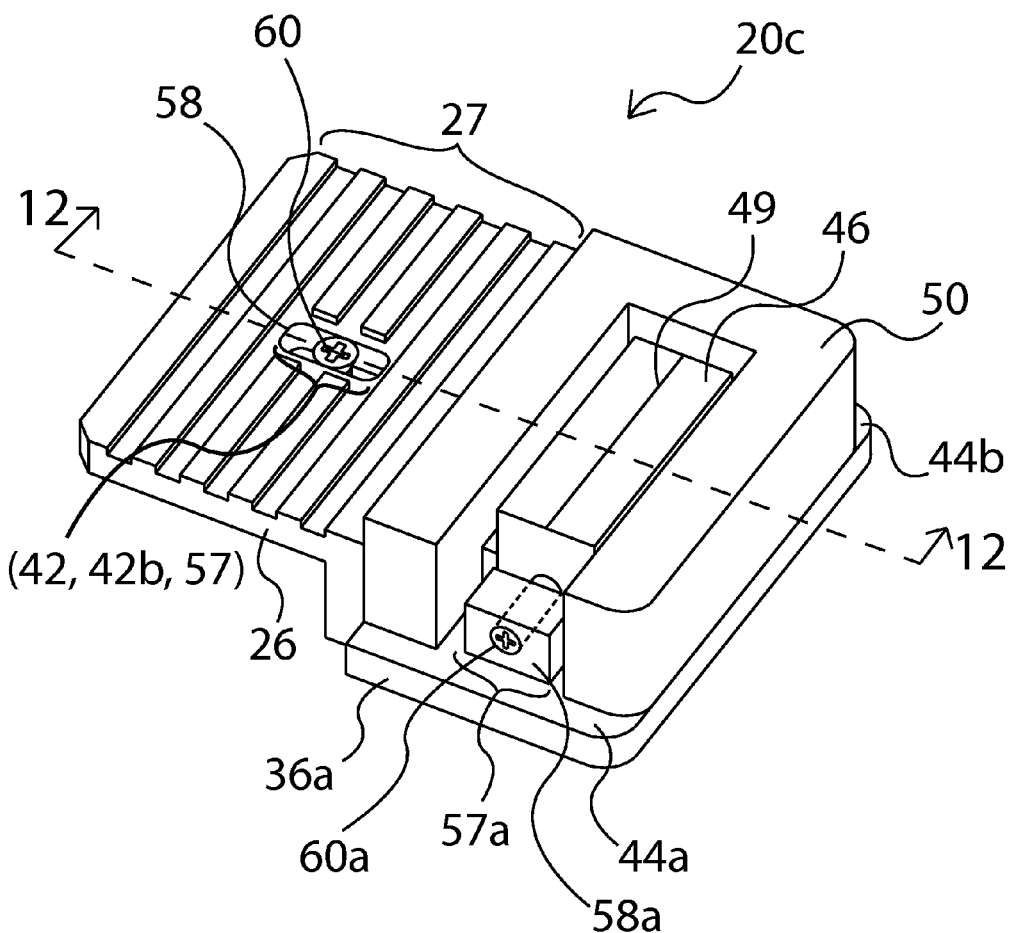
FIG. 11 is a bottom side, perspective view of one embodiment of a marking cartridge according to the present patent application illustrating an alignment lock having an aligner.
Figure 12:
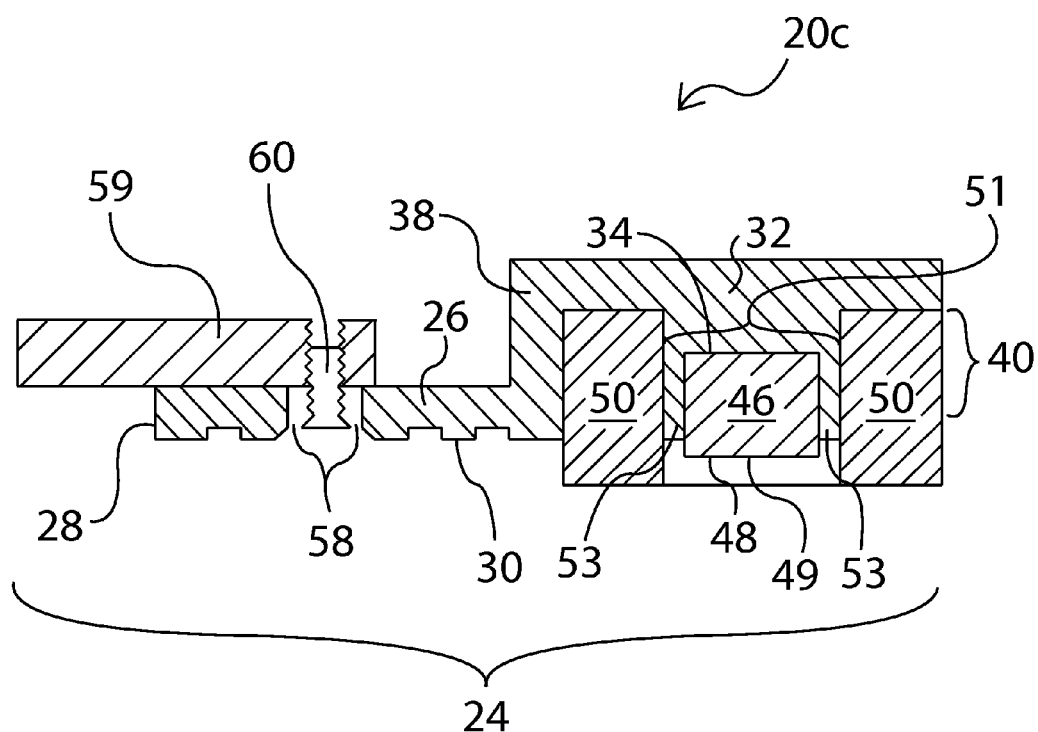
FIG. 12 is a left side, sectional view of the marking cartridge along line 12-12 in FIG. 11.

Marking cartridge 20 may also include an aligner 57 integrated with support structure 24. Aligner 57 is a variable aligner allowing for a plurality of small position adjustments that can be locked in place by securing element 60 after alignment. Aligner 57 variably adjusts the position of marking surface 48 to set a desired location for the mark relative to the measured information. For an embodiment where marking cartridge 20 is integrated with a tape measure, the measured information to be marked is the line on tape 56 or for a digital tape measure some other reference point that indicates the desired measurement a user wants to mark. Aligner 57 allows for a user to accurately adjust the position of marking surface 48, and any indicia 49, to information gathered by the measurement tool to whatever accuracy the user needs for a specific application by adjusting for placement inaccuracies of marking cartridge 20 and for any tolerance errors inherently created incurred during manufacture of the marking cartridge. FIGS. 11 and 12 show one embodiment of aligner 57 as integrated with a marking cartridge 20c. Aligner 57 includes both an adjustment element 58 and a securing element 60 for securing the alignment position. Adjustment element 58 may be a linear adjustment element allowing for movement in one direction or a multi-positional element that allows for movement in more than one direction. In FIGS. 11 and 12, aligner 57 is both an alignment lock (42,42b) and an aligner. Aligner 57 could be other aligners such a screw in a threaded hole, a support structure rotating around a pivot point, angled plates moving relative to each other, etc. Aligner 57 may also be an aligner that adjusts position of marking surface 48 by moving the position of marking element 46, such an aligner 57a is shown in FIG. 11. Aligner 57a uses an adjustment element 58a (threaded hole) and a securing element 60a (fastener). Although the embodiment shown in FIG. 11 for aligner 57a shows adjustment from side-to-side of marking element 46, it is understood that similar aligners could allow for alignment of the marking element front-to-back as well as up and down. For up and down movement, marking element 46 could be held on the end of a fastener that moves up and down through support structure 24. For front-to-back movement, marking element supports 53 could be opened up to leave room for movement and marking element 46 could be held on the end of a fastener that moves front-to-back through the marking element supports.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:
1. A marking cartridge for creating a mark that corresponds to measured information, comprising:
 a) a stepped support structure including i) an engaging element having an engaging end and enclosing surface, ii) a positioning element parallel to said engaging element, said positioning element having a vertical positioning surface and lateral edges, and iii) a vertical step connecting said engaging element to said positioning element to form a depressed support region;
 b) a cartridge alignment guide extending from each lateral edge;
 c) a marking element having a marking surface, said marking element mounted in said depressed support region to said vertical positioning surface such that said marking surface extends beyond said enclosing surface; and
 d) a resilient material mounted in said depressed support region to said vertical positioning surface and extending beyond said marking surface.

2. A marking cartridge as recited in claim 1, further including an alignment lock proximate said engaging end.

3. A marking cartridge as recited in claim 2, wherein said alignment lock has a slot with a side wall that tapers away from said slot.

4. A marking cartridge as recited in claim 2, wherein said alignment lock extends away from said enclosing surface.

5. A marking cartridge as recited in claim 2, wherein said engaging element includes an alignment lock release mechanism.

6. A marking cartridge as recited in claim 1, wherein said engaging element includes a textured gripping region on said enclosing surface.

7. A marking cartridge as recited in claim 1, wherein said engaging element includes a shock absorber.

8. A marking cartridge as recited in claim 1, wherein said positioning element includes a marking element alignment guide.

9. A marking cartridge as recited in claim 1, wherein said positioning element includes a marking element support.

10. A marking cartridge as recited in claim 9, wherein said marking element support further include holding grooves.

11. A marking cartridge as recited in claim 1, wherein said cartridge alignment guides together with said positioning element having a combined width greater than the width of said engaging element.

12. A marking cartridge as recited in claim 1, wherein said marking element is a porous material having matrix of connected pores impregnated with a marking substance.

13. A marking cartridge as recited in claim 12, wherein said marking surface is sealed to close said connected pores except for a region of open pores that form an indicia.

14. A marking cartridge as recited in claim 12, wherein said marking element includes sides, wherein said connected pores are sealed on said sides adjacent said marking surface.

15. A marking cartridge as recited in claim 1, whereby when said resilient material is pressed towards said marking surface, said resilient material uniformly compresses around said marking element.

16. A marking cartridge as recited in claim 1, wherein said resilient material is a porous foam.

17. A marking cartridge as recited in claim 1, wherein said resilient material circumscribes said marking element.

18. A marking cartridge as recited in claim 1, wherein said resilient material as a toughened surface.

19. A marking cartridge as recited in claim 1, wherein said vertical step is parallel to said engaging end.

20. A marking cartridge for creating a mark that corresponds to measured information, comprising:
 a) a support structure;
 b) a marking element having a marking surface that creates the mark;
 c) a resilient material mounted to said support structure and extending beyond said marking surface; and the
 d) a variable aligner integrated with said support structure to variably adjust the position of said marking surface to set a desired location for the mark relative to the measured information.

* * * * *